United States Patent [19]

Upmeier

[11] 4,425,290
[45] Jan. 10, 1984

[54] METHOD OF CONTROLLING THE FILM THICKNESS OF TUBULAR FILM PRODUCED IN A BLOWN FILM EXTRUDER INSTALLATION

[75] Inventor: Hartmut Upmeier, Lengerich of Westphalia, Fed. Rep. of Germany

[73] Assignee: Windmoller & Holscher, Lengerich, Fed. Rep. of Germany

[21] Appl. No.: 254,262

[22] Filed: Apr. 15, 1981

[30] Foreign Application Priority Data

Apr. 18, 1980 [DE] Fed. Rep. of Germany ....... 3014989

[51] Int. Cl.³ .............................................. B29D 23/04
[52] U.S. Cl. ..................... 264/40.1; 264/40.6; 264/519; 264/167; 264/210.5; 425/141; 425/144; 425/326.1; 425/379 R
[58] Field of Search ................... 264/40.1, 40.6, 40.7, 264/210.5, 569, 167, 519; 425/379 R, 381, 326.1, 141, 143, 144

[56] References Cited

U.S. PATENT DOCUMENTS

| | | | |
|---|---|---|---|
| 3,775,035 | 11/1973 | Scotto et al. | 425/144 |
| 3,835,209 | 9/1974 | Karabedian | 264/569 |
| 4,189,288 | 2/1980 | Halter | 264/569 |
| 4,209,475 | 6/1980 | Herrington et al. | 264/569 |
| 4,246,212 | 1/1981 | Upmeier et al. | 264/569 |
| 4,339,403 | 7/1982 | Upmeier et al. | 264/40.1 |
| 4,339,404 | 7/1982 | Upmeier et al. | 264/40.1 |

FOREIGN PATENT DOCUMENTS

| | | | |
|---|---|---|---|
| 2234876 | 1/1973 | Fed. Rep. of Germany | 425/144 |
| 2140194 | 2/1973 | Fed. Rep. of Germany | 425/380 |
| 2418452 | 10/1975 | Fed. Rep. of Germany | . |
| 2542331 | 9/1976 | Fed. Rep. of Germany | 425/141 |
| 2658518 | 6/1978 | Fed. Rep. of Germany | 264/40.3 |
| 1529222 | 10/1978 | United Kingdom | 264/519 |

OTHER PUBLICATIONS

Plastverarbeiter (No. 10), Jan. 27, 1976, p. 573.

*Primary Examiner*—Jeffery R. Thurlow
*Attorney, Agent, or Firm*—Fleit, Jacobson, Cohn & Price

[57] ABSTRACT

In an extruder for making blown tubular film, an extrusion nozzle is divided into equally long segments provided with temperature setting elements. The film thickness is measured over the circumference of the film and film sectors of equal cross-sectional area are allocated to the nozzle segments out of which they were extruded. To produce thick film portions, the associated nozzle segments are cooled accordingly and to produce thin portions the associated nozzle segments are heated accordingly.

4 Claims, 8 Drawing Figures

METHOD OF CONTROLLING THE FILM THICKNESS OF TUBULAR FILM PRODUCED IN A BLOWN FILM EXTRUDER INSTALLATION

The invention relates to a method of controlling the film thickness of tubular film produced in a blown film extruder installation, comprising a nozzle ring divided into tempering sectors of equal circumferential length provided with setting elements, film calibrating means, and a take-off apparatus for the film and means for storing the film.

After manufacture, tubular film made in blown film extruder installations is coiled to form reels so as to store the film and enable it to be transported for subsequent processing. During film production, it is usually inevitable that thick and thin film portions will occur and these are summated during coiling of the web of film, thereby possibly resulting in rolls containing annular beads. This can complicate or even prevent the further processing of the film. In the production of blown film, it is known to take off the tubular film reversingly by twisting the film bubble up to 360° so that any thick film portions are uniformly distributed over the roll in much the same way as a coil of rope. These helically displaced thick portions can, however, be disadvantageous in certain processing machinery because they can cause the film to wander laterally.

Prior German Patent Applications Nos. P 29 47 293.3 and P 30 02 903.9 describe methods for controlling the film thickness by which tubular film can be made without a reversing take-off, their thickness tolerances lying within such a narrow range that the film can be coiled to form cylindrical rolls even without a reversing take-off.

On the other hand, for certain products webs of film are required which possess one or more thicker zones over their cross-section. Such film is, for example, required to make products having zones subjected to a higher load or greater wear. Typical products of this kind are for example carrier bags with handle holes in which the region of the handle must be reinforced, or shrink hoods which must likewise be strengthened by thick portions at the vertical edges subjected to the particular impact loads of shrunk-enveloped stacks deposited on pallets.

It is known to make webs of film having thick portions by taking a film blowhead with an outlet gap of initially uniform width and using cumbersome trial and error to grind it wider at the intended thick portions. Apart from the difficulties of making blowhead with a nozzle gap having a width corresponding to the desired thickness profile of the film, the use of a blowhead having a nozzle gap with different widths over its circumference presents the additional disadvantage that the solidification line of the film zones extruded from the wider regions is at a higher level, thereby making it necessary to provide additional cooling fans for the thick film portions. The precise adaptation of the film blowhead is extraordinarily expensive and in any case will suit only a particular plastics granulate, a particular rate of output and cooling air conditions appropriate for the adaptation.

It is therefore the problem of the present invention to provide a method of controlling the film thickness of tubular film produced in a blown film extruder installation, by which film can be made with any desired thickness profile extruded out of the blowhead by means of a nozzle ring which has one and the same outlet gap width over its circumference.

According to the invention, this problem is solved in a method of the aforementioned kind in that, from the film thicknesses measured over the circumference of the tubular film, film sectors of equal cross-sectional area are formed in accordance with the number of tempering sectors and are allocated to the tempering sectors of the nozzle ring out of which they were extruded, and that, conforming to the desired thickness profile, to produce thick portions the tempering sectors at the nozzle ring associated therewith are cooled to the extent corresponding to the desired thickness and/or to produce thin portions the associated tempering sectors are heated. In the method of the invention, the method known from Patent Applications Nos. P 29 47 293.3 and P 30 02 903.9 is modified to control the film thickness to produce the films with thick portions, i.e. a predetermined non-uniform thickness profile, so that the principles described in said patent applications can also be employed for the method of the invention after appropriate modification.

The method of the invention can be defined by an algorithm so that, in practice, it can be carried out in a simple manner by using micro-processors and micro-computers.

Thick film portions are extruded from the regions of the nozzle ring which are associated with cooling tempering sectors because the cooled extruded plastics mass has a higher viscosity and is stretched to a smaller extent in the circumferential direction during inflation of the extruded tube to form a film bubble than are the warmer zones having a lower viscosity.

According to the invention, to produce thick or thin portions, the corresponding tempering sectors may be cooled or heated or simultaneously cooled and heated. If a thick portion proves to be too thin, the associated tempering sector may be cooled more intensively. Conversely, if a thick portion proves to be too thick, cooling of the associated tempering sector may be reduced. On the other hand, if a thin portion is too thick, the associated tempering sector may be heated. If the thin portion is too thin, the amount of heating may be reduced.

It must, however, be noted that thick and thin portions influence each other, so that the cooling of one zone produces thick portion as well as thin portions to each side of this zone. Thick and thin portions can therefore be produced solely by cooling or heating tempering sectors. Small differences in thickness can be achieved only by sector cooling. Sector heating can achieve larger thickness differences. However, the largest differences in thickness can be achieved if the respective tempering sectors are simultaneously heated and cooled. Film having thick portions and made by the method of the invention can be coiled in conventional manner. However, since this would not result in cylindrical coils, it is more desirable to deposit the film in zig-zag formation in a container.

Control of the thickness profile of the tubular film takes place in accordance with the invention by cooling or heating or cooling and simultaneously heating the tempering sectors according to the desired thickness profile. To enable the micro-computer which is preferably used to calculate in accordance with the desired thickness profile, the pattern of setting commands for the setting elements associated with the tempering sectors in a simple manner, it is desirable to start with zero tolerance control, i.e. to extrude a film of uniform thickness profile.

Preferably, therefore, before producing the desired thickness profile, film sectors of equal circumferential length and equal cross-sectional area are allocated to the tempering sectors of the nozzle ring from which they were extruded as is described in Patent Application No. P 29 47 293.3.

The starting profile with uniform thickness tolerance can, as is described in Patent Application No. P 30 02 903.9, also be obtained prior to setting the tempering segments to temperatures corresponding to the desired thickness profile in that film sectors of equal circumferential length are formed and from the measurements there are determined the mean thickness distributions over the individual film sectors, and that the values of the mean thickness distributions form a measure for the correcting command for the setting elements of the tempering sectors associated with the respective film sectors.

In a further embodiment of the invention, it is provided that, to control the film thicknesses, the respective centerlines of the thick portions as well as the thin portions of the set thickness profile are assumed to have been extruded in the correct position relatively to the associated tempering sectors of the nozzle ring, and that the tempering sectors at the nozzle ring associated with the film sectors of equal cross-sectional area determined from the measurement over the film circumference are appropriately cooled or heated upon a departure in the circumferential lengths of the film sectors of equal cross-sectional area from the circumferential length distribution determined by the desired film thickness profile. In this case, it must be borne in mind that substantially equal quantities are extruded from the sections of the nozzle ring associated with the tempering sectors, so that the film sectors of equal cross-sectional area and allocated to the respective tempering sectors in the correct position will exhibit shorter circumferential lengths with an increase in the thickness of the film. The circumferential lengths of the film sectors of equal cross-sectional area are therefore also a measure of the respective thickness of the film.

Since the thick film portions are at a temperature lower than the thin film portions when employing the method of the invention, the film will also cool off substantially uniformly over its circumference if there is uniform cooling over the film circumference. As a result, the solidification line will be disposed at roughly the same height without additional cooling means.

The take-off speed for the tubular web of film can desirably be adapted to the respective mean film thickness.

Examples of the invention will now be described in more detail with reference to the drawing, wherein.

Figure 1:
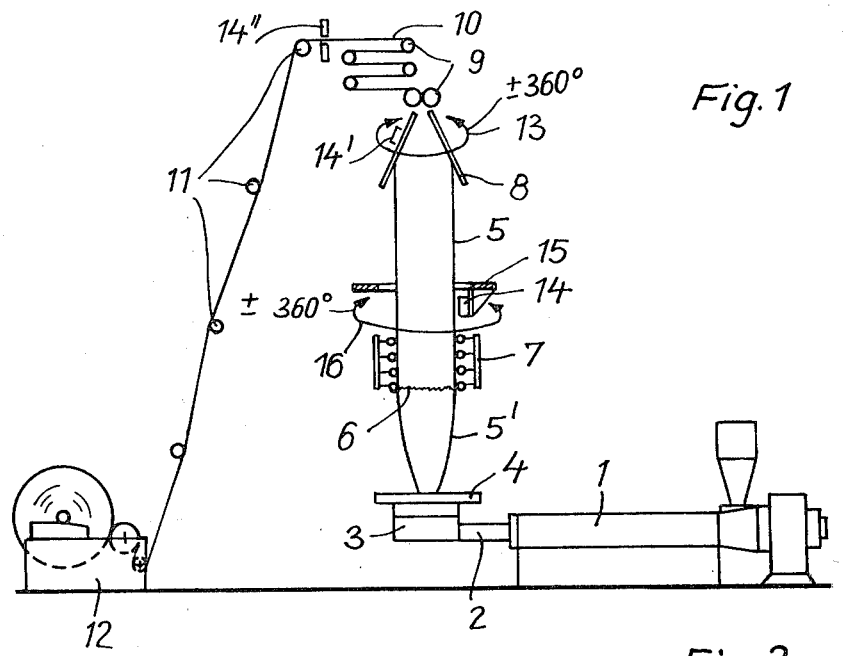
FIG. 1 is a diagrammatic side elevation of a blown film installation with means for detecting the film thickness tolerances.

In the installation shown in FIG. 1, the extruder 1 conveys the melt through the connector 2 into the blowhead 3 which forms the neck 5' of the film and cools the extruded tubular film by means of the cooling ring 4. The thickness measuring means 14 are disposed downstream of the film calibrating apparatus 7 which is at an elevation adapted to the height of the solidification line 6. The receiver of the thickness measuring means 14 is guided on the annular rail 15 and oscillates in the direction of the arrow 16 through ±360° about the tubular film 5. Above the measuring device, the tubular film is flattened by means of flattening plates 8, taken off by the pair of rollers 9, fed to the coiler 12 by means of the guide rollers 11 and is wound up.

Figure 2:
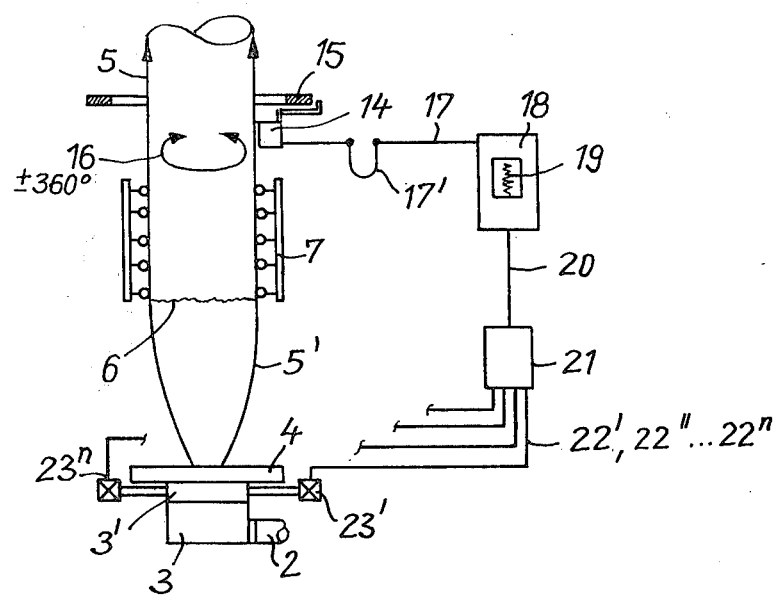
FIG. 2 is a diagrammatic representation of the connections between the thickness measuring apparatus with a micro-processor and the setting elements for setting the tempering sectors.

By way of the measuring conductor 17 shown in FIG. 2 having the cable loop 17', the measuring signal is fed to the measuring device 18 having the thickness recorder 19 which draws a diagram. By way of the cable 20, the measuring signal is also fed to the micro-computer 21 which, after converting the measuring sectors by way of the setting conductors 22, controls the setting elements 23', 23'' associated with the respective tempering sectors, as shown in FIG. 3.

Figure 3:
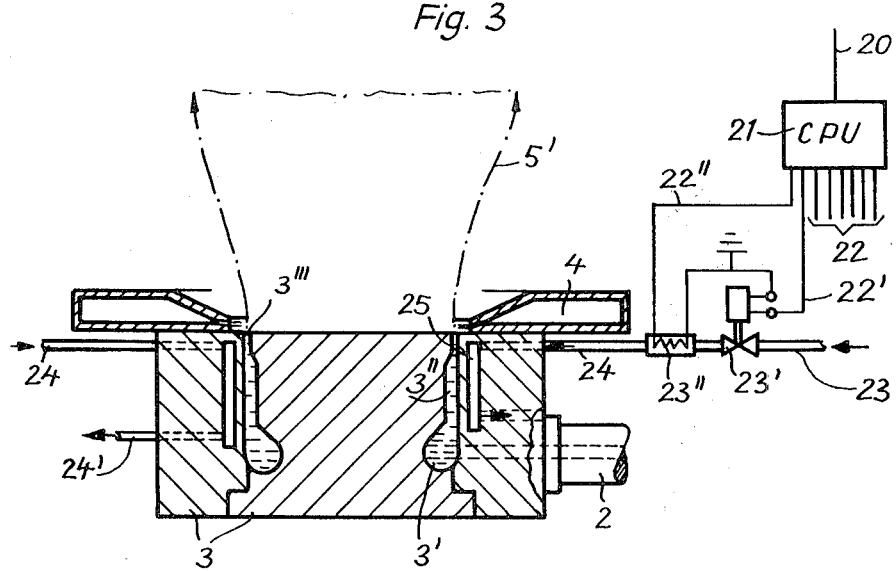
FIG. 3 is a diagrammatic section through the film blowhead with the tempering chambers and the setting elements.

To avoid mechanical deformation of the nozzle gap 3''', to produce a desired thickness profile in the extruded film the principle of sector tempering is employed by means of the closely juxtaposed parallel tempering bores 25 shown in FIG. 3. The melt supplied through the connecting flange 2 is distributed by the channel 3' and, in the narrow annular channel 3'', fed along the tempering bores 25 and, by heating or cooling, has its viscosity changed so that the intended thickness profile is produced during the subsequent stretching process in the neck 5' of the film.

Compressed air supplied through the pressure conduit 23 can be used as the tempering medium. The supply of compressed air is controlled with the aid of the cyclically operating magnetic valve 23' in accordance with the respective cooling command. The compressed air is fed to the bore 25 through the pipe 24 and discharged through the outlet 24'. If a heating command occurs, the heating member 23'' is switched on in parallel cycle to the magnetic valve 23' so as to produce a constant temperature for the hot air whilst the supply of heating energy is determined by the control of the volume of flow.

By means of a suitable programme, the desired thickness profile can be fed into the microcomputer which will then calculate the corresponding temperature pattern for the tempering segments and which appropriately acts on the setting elements 23', 23'' associated with the individual tempering segments.

Figure 4:
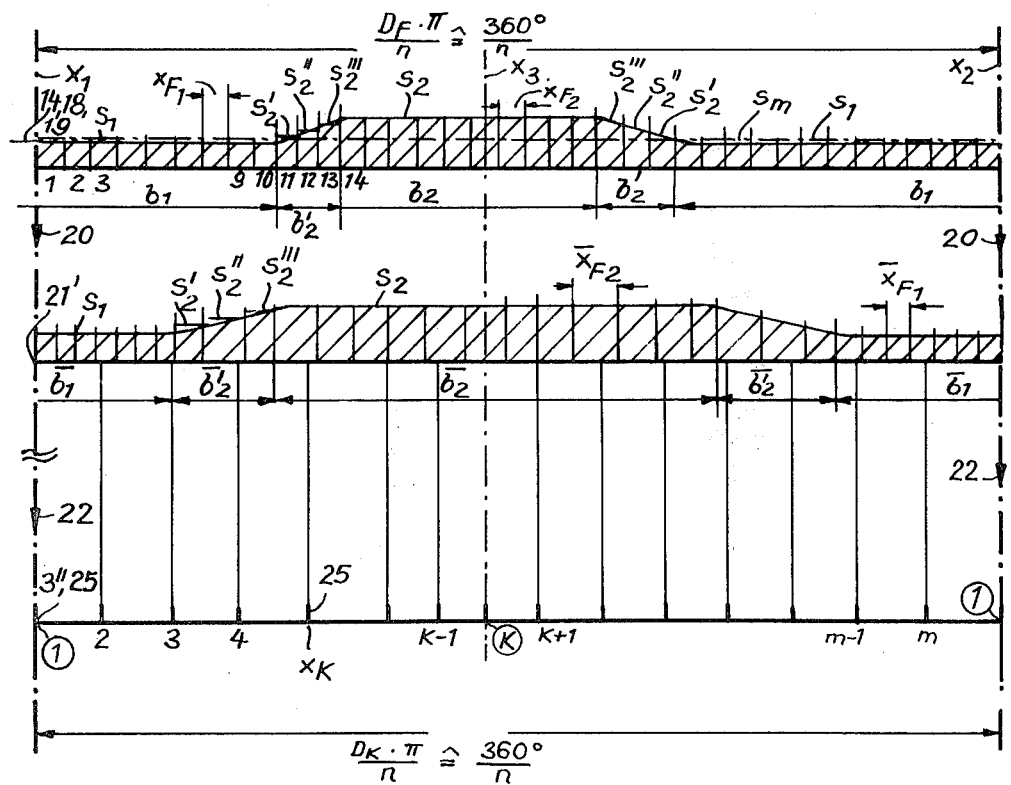
FIG. 4 is a diagram showing the connection between the thickness measurement with a micro-processor and the positionally correct transmission of the film sectors to the tempering sectors.
Figure 5:
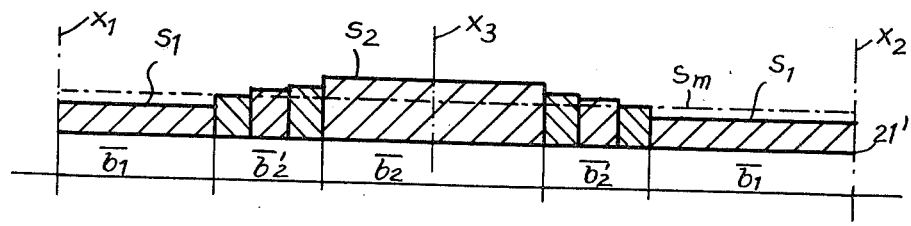
FIG. 5 is a simplified diagram corresponding to that of FIG. 4 of the transformed thickness profile.

In accordance with the teaching of Patent Application P 29 47 293.3, the central fields of the measuring sectors $x_F$ for the thick and thin portions are regarded as being correctly positioned in relation to the associated tempering sector $x_K$ as shown in FIG. 4. The width of the measuring or film sectors $x_F$ is so recalculated that they are represented as correctly positioned measuring sectors $\bar{x}_{F1}$ for the thin portions $x_{F1}$ and as correctly positioned measuring sectors $x_{F2}$ for the thick portions $x_{F2}$ as will be evident from the lower half of the diagram shown in FIG. 4.

To simplify the representation, FIGS. 4 to 8 illustrate the conditions near one thick portion $x_3$ whereas $x_1$ and $x_2$ designate the centres of the adjacent thin portions. The number of thick or thin portions is represented by 'n'. These need not be distributed uniformly but will in practice have a symmetrical distribution such as that resulting, for example, from the unequal edge lengths of shrink film for pallet shrink film packages.

As soon as the installation has been regulated to a uniform thickness tolerance, a start can be made on setting the desired thickness profile.

The intended thickness profile having, say, the illustrated thick portion with a thickness of $s_2$ and a width of $b_2$ is calculated from the predetermined film widths $b_1$ and $b_2$ by the micro-computer. From the computation, one obtains smaller widths $\bar{b}_1$ for thin portions and larger widths $b_2$ for thick portions.

With a view to obtaining a uniform strength transition, intermediate zones with a width of $b'_2$ are provided between the thick and thin portions. The transition zones $b'_2$ are correspondingly computed by the micro-computer from the predetermined thickness profile. The gradual reduction and increase in thickness is given by the thickness increment $s'_2$, $s''_2$, $s'''_2$, . . . as evident from the upper diagram of FIG. 4.

A new mean film thickness $s_m$ is calculated as a pure computed quantity from the intended thickness profile $b_1$, $s_1$, $b_2$ and $s_2$ and it serves as a reference line for the control algorithm (heating and cooling - FIG. 8) or for computing the widths $x_F$ of the measuring sectors.

the valve setting profile determined in the microprocessor after the initial zero tolerance control then has the computed thickness profile $s_1$, $b_1$, $s_2$, $b_2$ superimposed on it in the correct position.

Figure 6:
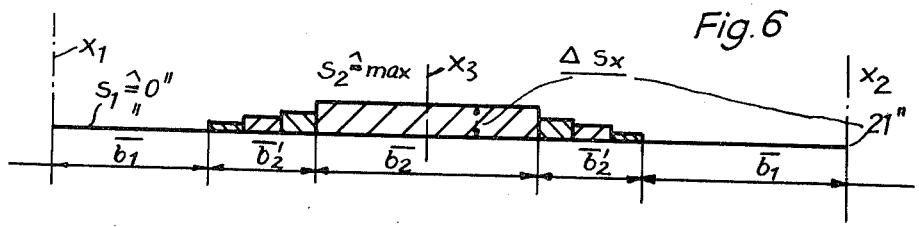
FIG. 6 is a diagram corresponding to that of FIG. 5 when using the principle of sector cooling only.
Figure 7:
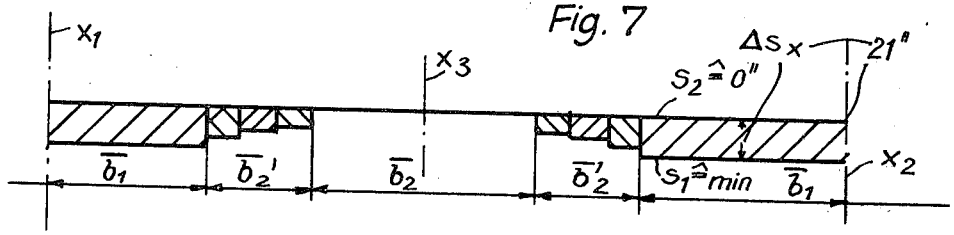
FIG. 7 is a diagram corresponding to that of FIG. 4 when using the principle of sector heating only.
Figure 8:
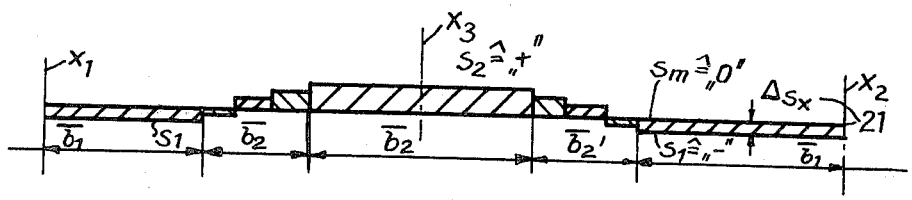
FIG. 8 is a diagram corresponding to that of FIG. 5 when using the principle of sector heating and cooling.

Whereas the tempering sectors are heated for thick portions and cooled for thin portions in the case of zero tolerance control, the tempering commands are reversed for setting the desired profile of the thick portions, so that there is cooling for intended thick portions and heating for intended thin portions. The quantity $\Delta s_x$ gives the heating and/or cooling command, the reference line being the thickness $s_1$ only for sector cooling, as shown in FIG. 6. If only sector heating is provided, the reference line is the thickness $s_2$ as shown in FIG. 7. For sector heating and sector cooling, one obtains the reference line $s_m$ as shown in FIG. 8.

If correcting steps are obtained, the corresponding differences are added to or subtracted from the operating memory of the central unit (CPU=Central Processing Unit).

I claim:

1. A method of controlling the film thickness of blown tubular film produced in a blown film extruder including an annular extrusion orifice divided into tempering segments into which a tempering medium can be introduced, and means for heating the periphery of said orifice at spaced circumferential positions therearound, said method comprising:

selecting a desired non-uniform film thickness profile;

adjusting the temperatures of the tempering medium to each of the several tempering segments in accordance with the desired film thickness profile by increasing the temperature of the tempering medium to the segments at which the film is to be relatively thin and decreasing the temperature of the tempering medium to the segments at which the film is to be relatively thick;

measuring the film thickness over the film circumference at a point where solidification has occurred; and adjusting the temperature of the tempering medium to each of the several tempering segments to correct and maintain the desired film thickness profile.

2. The method of claim 1, wherein the initial film thickness profile is uniform, and the method comprises the following additional initial steps:

dividing the circumference of said extrusion head into a plurality of sectors of substantially equal circumferential length; and extruding a blown film having a uniform thickness profile.

3. The method of claim 2 which comprises the following additional steps:

measuring the mean thickness of the non-uniform film profile; and comparing the measured non-uniform film thickness profile with said desired non-uniform film thickness profile and providing a correction command for the respective tempering sectors, the correction command being a function of the difference between the desired profile and the measured profile.

4. The method of claim 3, wherein said correction command is determined by adding to or subtracting from the mean thickness distribution the differences between the measured thickness and the desired thickness of the particular sectors.

* * * * *